United States Patent [19]

Brouwer

[11] 4,098,072

[45] Jul. 4, 1978

[54] DIGITAL CLOCK GEARING

[75] Inventor: Frans Brouwer, Glencoe, Ill.

[73] Assignee: Stewart-Warner Corporation, Chicago, Ill.

[21] Appl. No.: 704,101

[22] Filed: Jul. 2, 1976

[51] Int. Cl.² .......................... G04B 13/00; G04C 3/00; G04B 19/02; F16H 55/18

[52] U.S. Cl. .......................................... 58/125 C; 58/7; 58/23 D; 74/409; 235/1 C

[58] Field of Search .................... 58/2, 7, 8, 23 D, 59, 58/125 C, 126 E, 138, 16 D, ; 74/409, 411; 235/1 C, 96, 104, 103, 139

[56] References Cited

U.S. PATENT DOCUMENTS

| | | | |
|---|---|---|---|
| 2,513,217 | 6/1950 | Tomlines | 74/409 |
| 3,574,995 | 4/1971 | Turner | 58/125 C |
| 3,918,252 | 11/1975 | Haydon | 58/125 C |
| 3,963,903 | 6/1976 | Pirro et al. | 235/1 C |

FOREIGN PATENT DOCUMENTS

| | | | |
|---|---|---|---|
| 797,322 | 7/1958 | United Kingdom | 74/409 |

OTHER PUBLICATIONS

Product Engineering, 18 Ways to Control Backlash in Gearing, Gutmann, Fredrick T., pp. 71–75.

*Primary Examiner*—Edith S. Jackmon

[57] ABSTRACT

A digital clock having backlash-free gearing between a step motor and digit wheels that indicate time. The gearing includes an input pinion connected to the step motor, intermediate gearing driven by the pinion and an output ring gear driven by the intermediate gearing and connected to drive a seconds digit wheel of the clock mechanism. A pivotal bracket rotatably carries the intermediate gearing and is biased in one direction by a spring so that the intermediate gearing is urged into backlash-free engagement with both the input pinion and the output ring gear. The bracket tilts as well as pivots to permit the intermediate gearing to properly mesh with both the input pinion and the output ring gear.

7 Claims, 5 Drawing Figures

DIGITAL CLOCK GEARING

BACKGROUND OF THE PRESENT INVENTION

Digital clocks have gained wide popularity over the last decade. There have been provided many forms of digital clock mechanisms and many forms of gearings employed in these mechanisms. When a step motor is used to drive the gearing and an odometer type readout is provided, the gearing creates noise. This noise is caused in part by the step motor which irregularly impacts the mating gears causing them to rattle. It might be possible to eliminate most of this rattle by providing precision alignment between the gears. This however will not completely eliminate the rattle.

Moreover, temperature is a problem if the motor pinion is very precisely set and the gearing will bind at low or high temperatures. In commercial digital clocks, the gears are usually made of plastic and the shaft centers are determined by a metal structure. This results in differential temperature coefficients that may also cause binding problems.

A still further problem in these gears that have been set precisely with low backlash, is that they are very vulnerable to the slightest amoung of dust and dirt which also causes binding.

It is a primary object of the present invention to eliminate these prior problems in gearing in digital clocks.

SUMMARY OF THE PRESENT INVENTION

According to the present invention, a digital clock mechanism is provided having gearing in which the mating gears are resiliently biased in meshing engagement to eliminate the problems of backlash, rattling, temperature variations and dirt. The basic clock gearing, according to the present invention, consists of a pinion gear driven by a step motor, intermediate gearing driven by the pinion gear, and an output ring gear driven by the intermediate gearing connected to drive the first digit wheel, which may for example be the seconds wheel in an odometer type readout modified for clock use. The gear teeth are slightly undercut so that the tops of the teeth will not bottom in the valleys between the teeth. The intermediate gearing has a preloaded pivot which takes the form of a pivotally mounted bracket that rotatably carries the intermediate gearing and is biased by a spring in a direction so that the gears become backlash free.

In addition to being pivotally mounted, the bracket is also tiltable in a perpendicular plane so that the intermediate gearing can properly mesh with both the step motor pinion and the output ring gear even though there may be some misalignment therebetween, dirt or adverse temperature conditions.

Thus, the intermediate gearing will move sideways under the spring load until the backlash at the motor pinion is zero. At that point, there may still be backlash between the intermediate gearing and the output ring gear. In this case, the bracket will tilt until the backlash in the output ring gear is also eliminated. When the intermediate gear assembly comes to rest under the spring load, this represents a stable position. Noise is totally eliminated and no binding has been found between −40° F and +180° F and the gear assembly allows dirt to be rolled through the mesh between the motor pinion and the intermediate gear assembly without binding.

DETAILED DESCRIPTION OF THE PREFERRED EMBODIMENT

Figure 1:
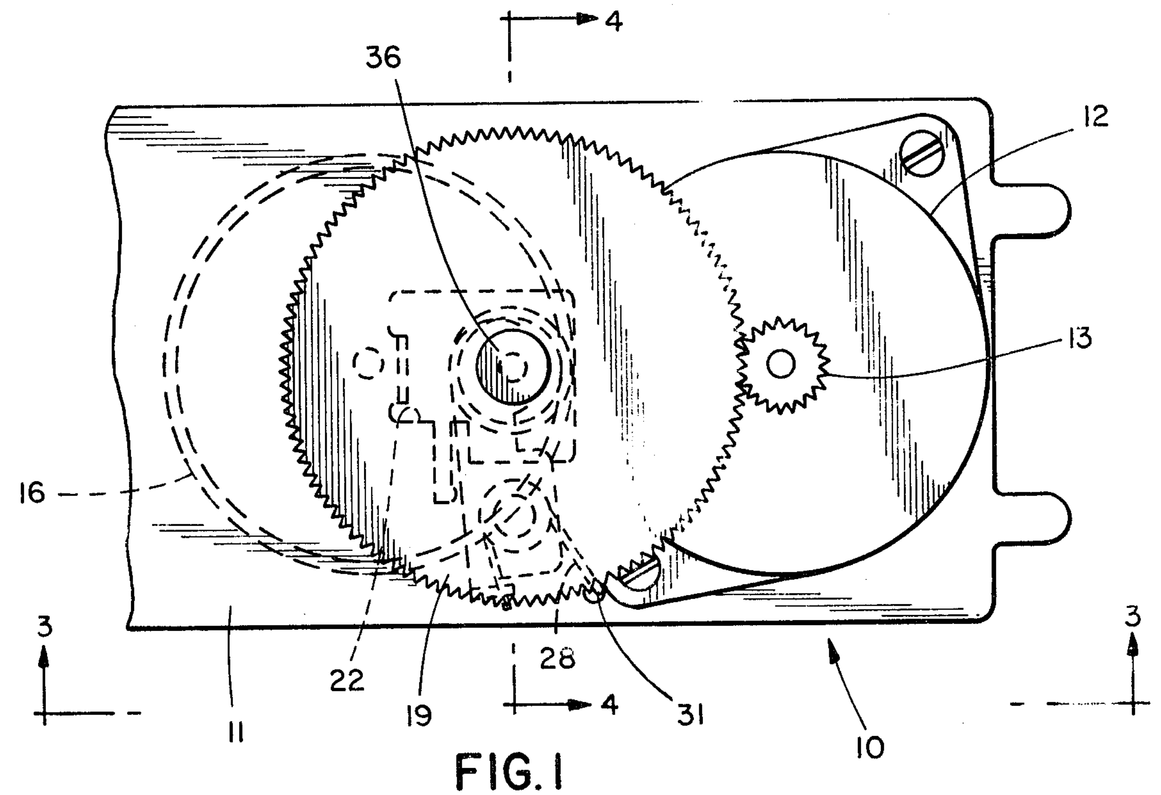
FIG. 1 is a subassembly side view of a digital clock according to the present invention.

Referring to the drawings, a digital clock assembly 10 is illustrated consisting generally of a frame member 11, a step motor 12 driving an input pinion 13, intermediate gear assembly 14 driven thereby, and an output ring gear 16 driven by the intermediate gearing and connected to a seconds digit wheel 17. There are of course also provided in the present clock, minutes, tens and hour digit wheels that are not illustrated in the drawings but the mechanical movements between the digit wheels form no part of the present invention.

Figure 4:
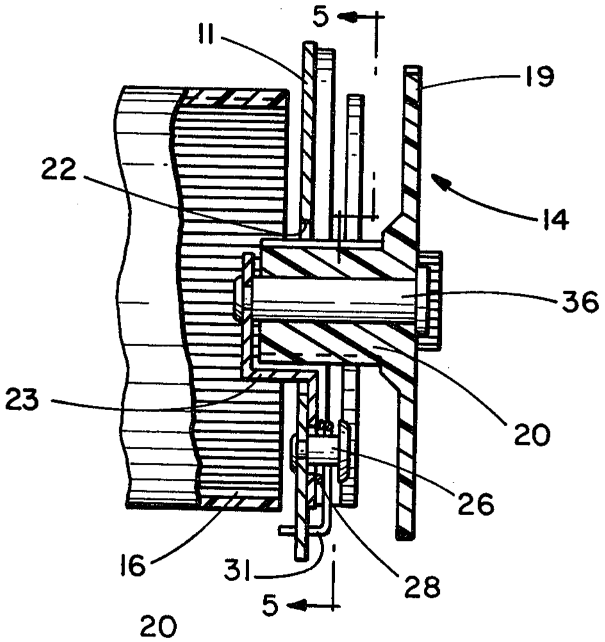
FIG. 4 is a fragmentary section taken generally along line 4—4 of FIG. 1.

Pinion 13 is a plastic gear as are the other gears in the present assembly. Pinion 13 moves in stepped rotation driven by the stepping motor 12. Pinion 13 meshes with a large gear 19 in the intermediate gear assembly 14. As seen more clearly in FIG. 4, the gear 19 is formed integrally with an axially extending smaller gear 20, also forming part of the intermediate gear assembly 14. The smaller gear 20 meshes with and drives the output ring gear 16. The smaller gear 20 extends through a generally rectangular opening 22 in frame member 11.

A preloading bracket assembly 23 is provided for rotatably supporting the intermediate gear assembly 14 and for biasing the gear assembly into driving engagement with both the pinion 13 and the output gear 16 in a backlash free manner. The bracket 23 consists of a lower vertical portion 24 having an aperture 25 that receives a rivet 26 fixed to the frame member 11 through aperture 27 therein. This gives the bracket 23 pivotal movement about an axis parallel to the axes of the various gears in the entire gearing assembly.

Figure 2:
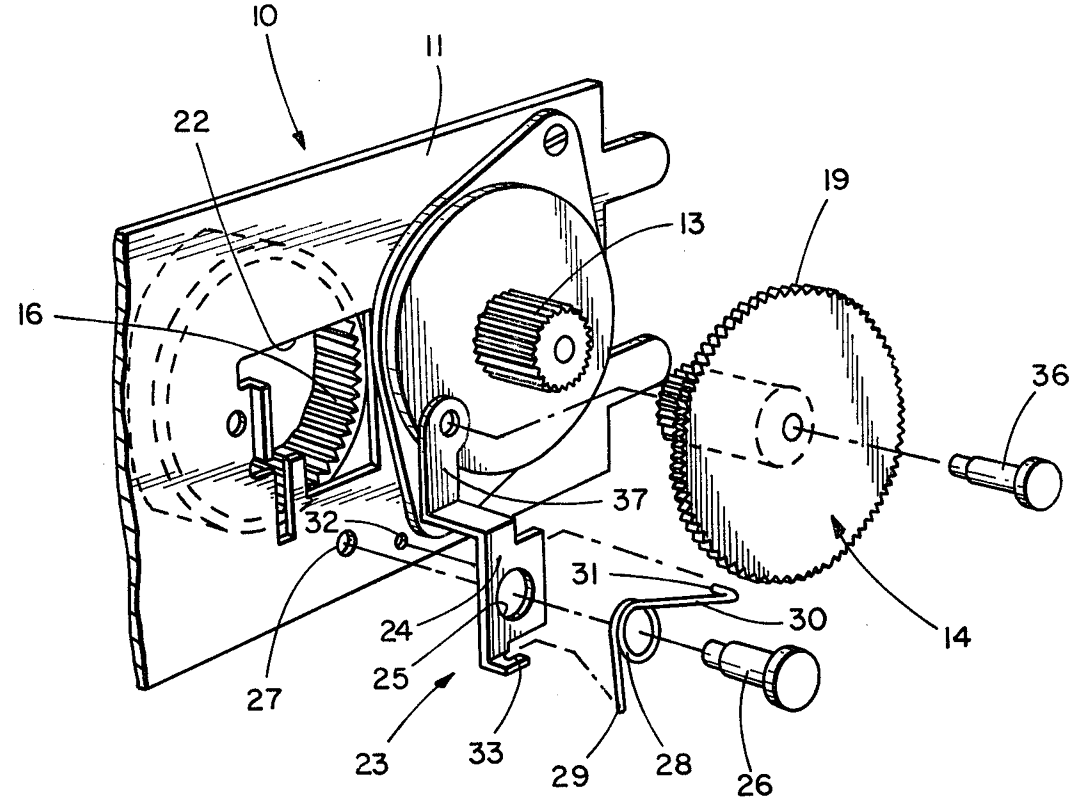
FIG. 2 is an exploded view of the gearing and certain other parts of the digital clock shown in FIG. 1.
Figure 3:
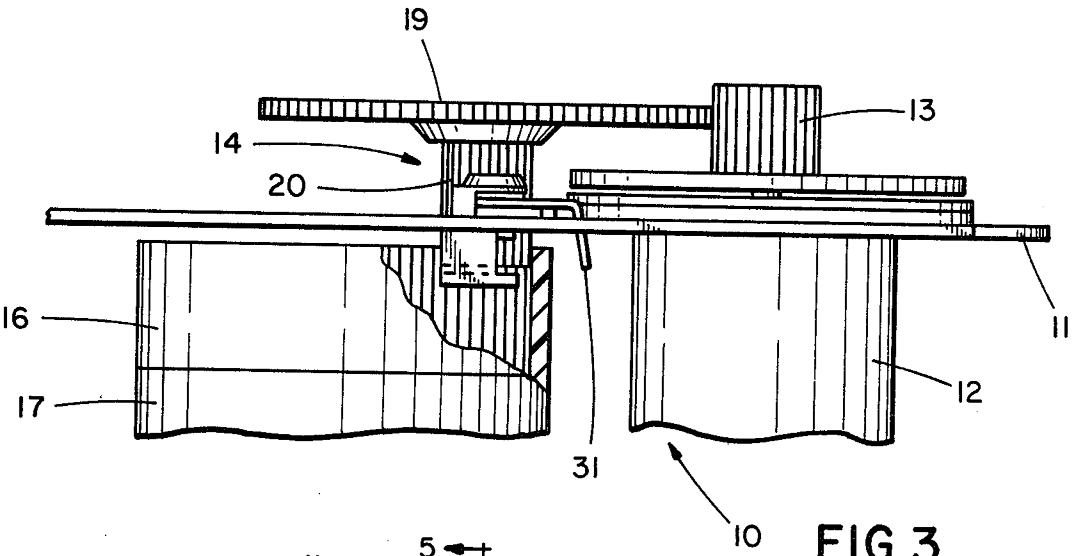
FIG. 3 is a bottom view taken generally along line 3—3 of FIG. 1.
Figure 5:
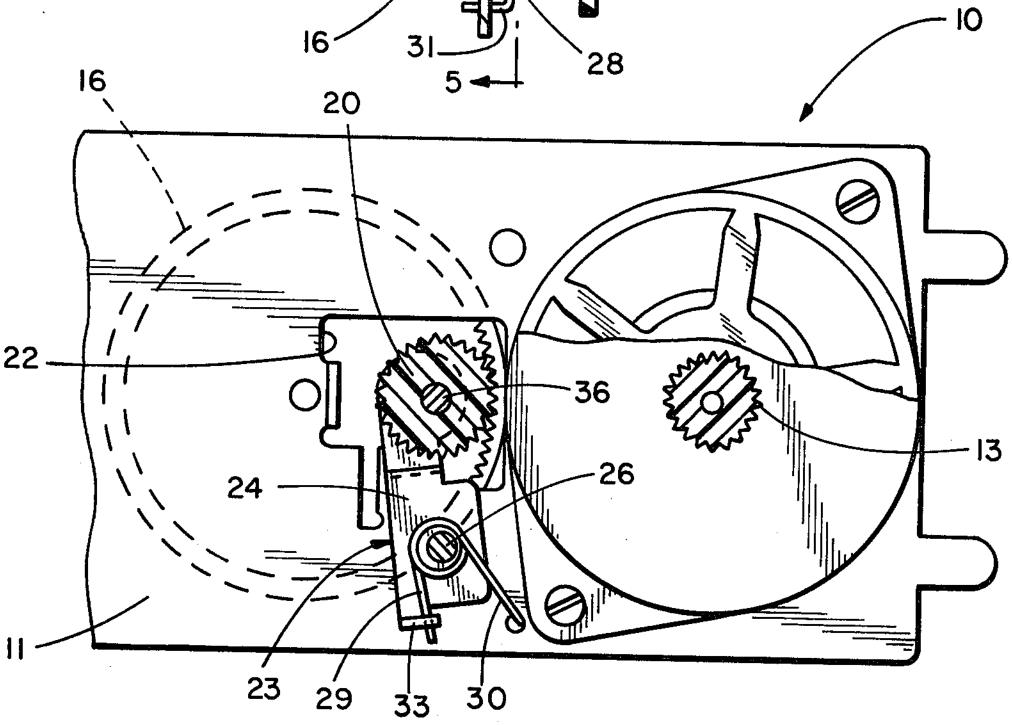
FIG. 5 is a cross-section taken generally along line 5—5 of FIG. 4.

The bracket 23 also has tilting movement with respect to a plane perpendicular to the axes of the gears. This is effected by providing a loose fit between the rivet 26 and the aperture 25 in bracket 23. Spring 28, having arms 29 and 30, is provided for urging the bracket 23 in a clockwise direction as viewed in FIGS. 1, 2 and 5. Spring 28 encircles the rivet 26 and has a projection 31 received in aperture 32 in the frame 11. Arm 29 is received in a grooved projection 33 extending from the lower portion of the vertical leg 24 of the bracket. Thus, the spring 23 reacts against aperture 32 urging the bracket in a clockwise direction as seen in FIGS. 2 and 5. Rivet 36 extends through gear 14 and is fixed to upstanding portion 37 of bracket 23 for rotatably supporting the intermediate gearing.

In operation, bracket 23 urges the intermediate gear assembly 14 toward the pinion gear 13 and the output ring gear 16. Because of loose tolerances one of the gears 19 and 20 will mesh first with one of the gears 13 and 16. After the first set of mating gears mesh in a backlash free manner, the bracket 23 will tilt so that the other set of mating gears will also mesh in a backlash free manner, providing noise free meshing engagement between all of the gears in the drive train for the present digital clock mechanism.

What is claimed is:

1. A digital clock assembly, comprising; motor means, input gearing drawn by said motor means, output gearing, digit wheels drawn by said output gearing, intermediate gearing between said input gearing and said output gearing, resilient means biasing said intermediate gearing into engagement with said input gearing and said output gearing to eliminate the backlash therebetween, said resilient means biases said intermediate gearing including a bracket pivotal about an axis, spring means biasing said bracket, said bracket axis being substantially parallel to the axis of said intermediate gearing, said bracket and said intermediate gearing also being tiltable in a plane parallel to said bracket axis so that backlash is removed between said intermediate gearing and both said input gearing and said output gearing.

2. A digital clock assembly as defined in claim 1, including a coil spring biasing said bracket.

3. A digital clock assembly as defined in claim 1, wherein said motor means includes a step motor.

4. A digital clock assembly, comprising; motor means, input gearing driven by said motor means, output gearing, digit wheels driven by said output gearing, and intermediate gearing between said input gearing and said output gearing, resilient means biasing said intermediate gearing into engagement with said input gearing and said output gearing to eliminate the backlash therebetween, said resilient means biasing said intermediate gearing including a pivotal bracket, said bracket being pivotal in a plane perpendicular to the axis of said intermediate gearing, said resilient means biasing said intermediate gearing including a bracket pivotal about an axis, spring means biasing said bracket, said bracket axis being substantially parallel to the axis of said intermediate gearing, said bracket and said intermediate gearing also being tiltable in a plane parallel to said bracket axis so that backlash is removed between said intermediate gearing and both said input gearing and said output gearing.

5. A digital clock assembly, comprising; motor means, input gearing driven by said motor means including a step motor, output gearing, digit wheels driven by said output gearing, and intermediate gearing between said input gearing and said output gearing, resilient means biasing said intermediate gearing into engagement with said input gearing and said output gearing to eliminate the backlash therebetween, said resilient means biasing said intermediate gearing including a pivotal bracket, said bracket being pivotal in a plane perpendicular to the axis of said intermediate gearing, said resilient means biasing said intermediate gearing including a bracket pivotal about an axis, spring means biasing said bracket, said bracket axis being substantially parallel to the axis of said intermediate gearing, said bracket and said intermediate gearing also being tiltable in a plane parallel to said bracket axis so that backlash is removed between said intermediate gearing and both said input gearing and said output gearing.

6. A digital clock assembly, comprising; frame means, a step motor supported on said frame means, an input pinion gear driven by said step motor, an output internal ring gear, a first digit wheel driven by said output ring gear, a first intermediate gear driven by said pinion gear, a second intermediate gear fixed to said first intermediate gear and drivingly connected to said output ring gear, a carrier bracket rotatably supporting both said first and second intermediate gears, said bracket being pivotally mounted on said frame means and a spring reacting against said frame means and biasing said bracket so that the intermediate gears mesh with the input pinion and the output ring gear.

7. A digital clock assembly as defined in claim 6, wherein said bracket is tiltably mounted on said frame means so that the axis of the first and second intermediate gears may tilt to assure proper meshing with both the input pinion and the output ring gear.

* * * * *